United States Patent
Travers et al.

(10) Patent No.: US 10,254,723 B2
(45) Date of Patent: Apr. 9, 2019

(54) COLOUR 3-DIMENSIONAL PRINTING

(71) Applicant: Mcor Technologies Limited, Dunleer, Co. Louth (IE)

(72) Inventors: James Travers, Rush (IE); Philip Keenan, Baldock (GB); Fintan MacCormack, Ardee (IE); Conor MacCormack, Ardee (IE)

(73) Assignee: MCOR TECHNOLOGIES LIMITED, Dunleer, Louth (IE)

( * ) Notice: Subject to any disclaimer, the term of this patent is extended or adjusted under 35 U.S.C. 154(b) by 805 days.

(21) Appl. No.: 14/403,030

(22) PCT Filed: May 22, 2013

(86) PCT No.: PCT/EP2013/025002
§ 371 (c)(1),
(2) Date: Nov. 21, 2014

(87) PCT Pub. No.: WO2013/174526
PCT Pub. Date: Nov. 28, 2013

(65) Prior Publication Data
US 2015/0165689 A1    Jun. 18, 2015

(30) Foreign Application Priority Data

May 22, 2012 (GB) .................................. 1208991.8

(51) Int. Cl.
*B29C 64/147* (2017.01)
*B29C 64/223* (2017.01)
(Continued)

(52) U.S. Cl.
CPC ............ *G05B 15/02* (2013.01); *B29C 64/141* (2017.08); *B29C 64/147* (2017.08);
(Continued)

(58) Field of Classification Search
CPC ............ B29C 67/0074; B29C 67/0088; B29C 64/209; B29C 64/223; B29C 64/245;
(Continued)

(56) References Cited

U.S. PATENT DOCUMENTS

| 5,015,312 A | 5/1991 | Kinzie |
| 6,506,477 B1 | 1/2003 | Ueda et al. |

(Continued)

FOREIGN PATENT DOCUMENTS

EP    2141003 A2    1/2010

*Primary Examiner* — Yogendra N Gupta
*Assistant Examiner* — Joseph S Leyson
(74) *Attorney, Agent, or Firm* — Schwabe Williamson & Wyatt, PC

(57) ABSTRACT

Provided is a Layered Object Manufacturing, LOM, system configured to assemble a plurality of individual media layers to form a colored three-dimensional (3D) object, the system comprising a printer configured to color print at least a portion of a first surface of each of a plurality of media layers, and color print a corresponding portion of a second surface of the media layer, the second surface being opposite to the first surface, such that on operably printing the second surface a print-through region in the media layer is provided, and a collator configured to assemble the plurality of the individual media layers to form the 3D object. Also provided is a color 3D object media layer printing module for providing a print-through region in a 3D object media layer. Also provided is an ink for use in a Layer Object Manufacturing (LOM) system including the printing module.

28 Claims, 15 Drawing Sheets

(51) Int. Cl.
  *G05B 15/02* (2006.01)
  *B29C 64/141* (2017.01)
  *B29C 64/386* (2017.01)
  *B33Y 50/02* (2015.01)

(52) U.S. Cl.
  CPC .......... *B29C 64/223* (2017.08); *B29C 64/386* (2017.08); *B33Y 50/02* (2014.12)

(58) Field of Classification Search
  CPC ....... B29C 64/40; B29C 64/147; B33Y 30/00; B33Y 40/00; B33Y 50/02
  See application file for complete search history.

(56) References Cited

U.S. PATENT DOCUMENTS

| | | | |
|---|---|---|---|
| 2005/0062788 A1* | 3/2005 | Silverbrook | B41J 2/155 347/20 |
| 2009/0195833 A1* | 8/2009 | Lapstun | B41J 2/0057 358/1.15 |
| 2010/0066795 A1* | 3/2010 | Shimamura | B41J 3/60 347/104 |
| 2011/0094441 A1* | 4/2011 | MacCormack et al. | B05C 1/080 118/204 |
| 2011/0222081 A1* | 9/2011 | Yi et al. | |

\* cited by examiner

Front Image Alignment Target

Rear Image Alignment Target with Rear Illumination

COLOUR 3-DIMENSIONAL PRINTING

FIELD OF THE INVENTION

The present teaching relates to Layered Object Manufacture (LOM) systems for rapid prototyping (RP), and in particular to a printing module and methods for printing 3-Dimensional (3D) object media layers to form a colour 3D object in a LOM system. The present teaching also provides an ink for use in such an LOM system.

BACKGROUND

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional articles can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic, or metal laminates which are then successively glued together and cut to shape with a knife or laser cutter.

LOM, similarly to other rapid prototyping techniques, conventionally involves the use of a three dimensional (3D) computer aided design (CAD) of an object/part to be made, from which a stereolithography (STL) or other suitable format file is generated within a CAD package. The STL file is processed and in effect virtually sliced in the Z-axis at a thickness matching the thickness of the substrate material used. This creates a series of cross sections of the part and at any particular height each one has a simple two dimensional (2D) profile. A profiling, or cutting, apparatus may be used to trace the 2D profiles and thus cut the shapes onto thin sheets of raw material. In LOM, each individual thin sheet may be stacked and bonded one on top of another to produce a finished 3D object. The order of the profiling, stacking and bonding processes may be interchanged.

Colour 3D printing involves applying colour digitally to each of the layers used in the fabrication of a 3D printed article. Colour is required at the required intensity on each surface of the final 3D printed article as follows:
- the front surface—the uppermost surface of the printed media
- the rear surface—the underside surface of the printed media
- the profiled edge—the edge of the media that has been cut according to the digital profile for that layer in the 3D article It is desirable that the ink is absorbed by the media layer, such as paper, through its entire thickness (referred to as strike through or print through) as each object layer requires colour throughout its volume. However, in conventional colour 3D printing, the ink tends to percolate throughout the open porosity of the media causing the image to spread beyond the initial contact area that the ink has with the media. This is particularly problematic when 3D colour printing takes place from one side of the media alone.

For example as shown in FIG. 1a, inkjet printing colour 80a onto a medium such as a powder layer 120 using a conventional 3D colour printer relies on printing from one side only. During the ink absorption process, the ink 80a spreads into the thickness of the layer 120 and continues to spread into a wider area than the original contact area, as indicated in FIG. 1b. In addition there is no physical barrier to prevent the ink to continue to spread into a previously printed layer 130 beneath the target layer 120, which may lead to an intermixing of printed layers, as illustrated in FIG. 1b. The intermixing region is designated by reference numeral 80c. Both spread of ink and layer intermixing causes a degradation in image acuity, that is, blurring of image and diffuse colours. FIG. 1c illustrates the finished object, comprising diffuse surfaces and colour mixing regions 80c. It will be appreciated such a solution, while providing colour within the 3D environment does not provide an optimal solution. In addition, referring to FIG. 1d, by printing from one side only of the media layer, it is necessary to print adjacent dots sufficiently close together so as to ensure no areas of the media layer are left unprinted particularly on the lower layer surface. By bringing ink dots together, their subsequent bleed in the X and Y in-plane will cause them to converge and produce a mixed colour typically appearing as a brown or black. To avoid colour mixing, the printing density must be reduced to avoid the intermixing of inks, and this would result in surfaces that have a lower than optimal ink drop density, as illustrated in FIG. 1e.

In another aspect of conventional inkjet printing, the media is treated with a sizing agent or filler, to render the media physically less susceptible to the migration of ink, from the front printed side, to the rear side of the media by reducing the amount of porosity available for ink to find pathways for flow. Surface sizing agents (applied to the media surface) may be modified starches, hydro colloids such as gelatine, or alkyl ketene dimers, which are amphipathic molecules with hydrophilic ends facing the cellulose fibres, and hydrophobic tails facing out towards the ink, creating a degree of water repellency and resistance to ink flow and penetration. Typical ink used in inkjet printing uses water as the predominant solvent.

In colour 3D printing it is desirable that the ink fully saturates the media so that the paper is coloured in three dimensions. There are limitations in the types of media, such as paper, that are suitable for use in conventional LOM systems. As paper is composed of a randomly felted layer of fibre, it follows that the structure may have varying degrees of porosity. Paper is a highly porous material and contains as much as 70% air. The porosity of a sheet is an indicator of the moisture absorption capacity of the paper, or the ability of a particular sheet of paper to accept ink or water. When selecting a particular type of paper for LOM, it is therefore important to consider the porosity of the media.

Commonly, ink used in desktop inkjet printing onto paper is water based, with binders, and dyes or pigments imparting colour.

After a plurality of media object layers are formed, a profiling and layer bonding process is performed. The plurality of layers are bonded together, and then a profiling or weeding process is performed which comprises removing unwanted support material from the printed media stack to reveal the 3D printed object. Conventionally, during the weeding process, a technician performing the task has to observe a 3D model object on a computer screen as he/she removes the unwanted layers during weeding.

There are therefore a number of problems with colour 3D printing processes for use in LOM systems for rapid prototyping that need to be addressed.

SUMMARY

These and other problems are addressed by a Layered Object Manufacturing (LOM) system configured to perform a colour 3D printing process provided in accordance with the present teaching.

Accordingly the present teaching provides a LOM system. Also provided is a printing module. Also provided are an ink and medium for colour 3D printing. Advantageous features are provided in the dependent claims.

These and other features of the present invention will be better understood with reference to the following drawings.

BRIEF DESCRIPTION OF THE DRAWINGS

The present invention will now be described with reference to the accompanying drawings in which.

DETAILED DESCRIPTION OF THE DRAWINGS

Figure 1A:
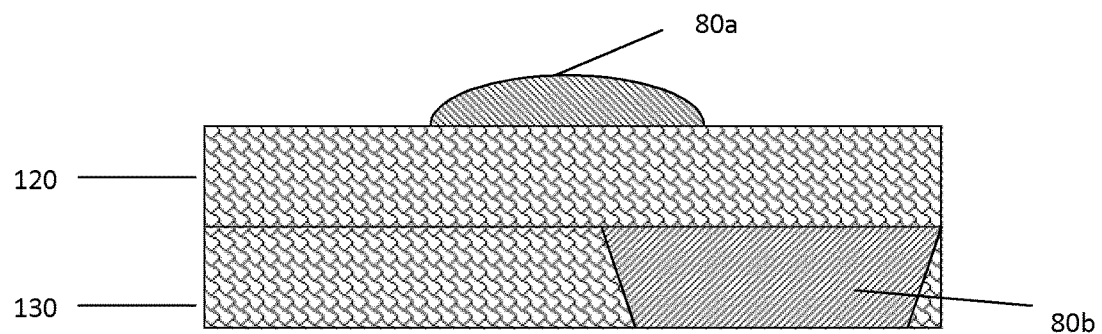
FIG. 1a is a sectional view illustrating inkjet printing colour onto a gypsum layer according to a conventional process.
Figure 1B:
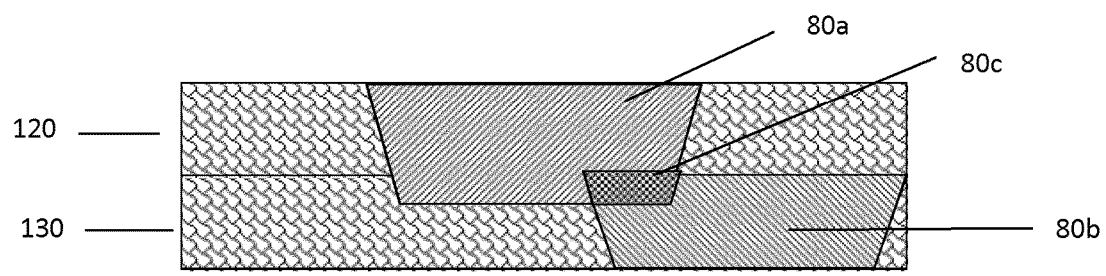
FIG. 1b illustrates ink from a current printed layer interacting with a previous layer in a conventional process.
Figure 1C:
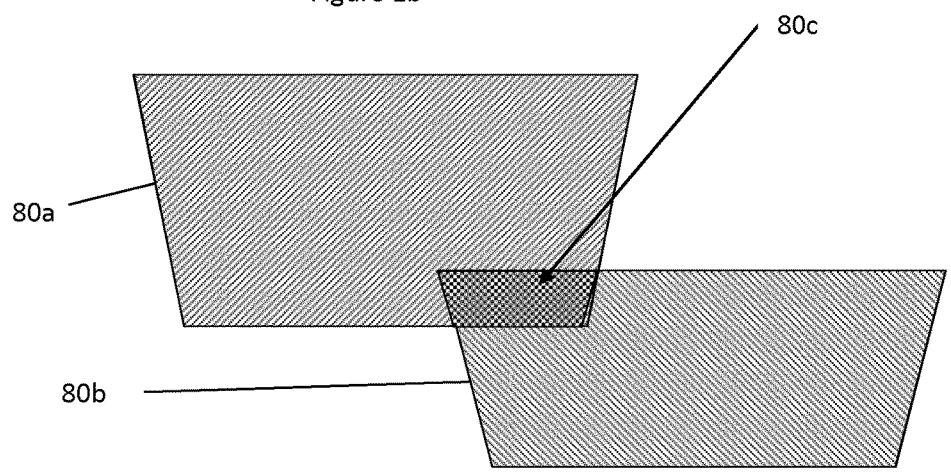
FIG. 1c illustrates a finished object obtained using the conventional process, showing diffuse surfaces, and colour mixing regions.
Figure 1D:
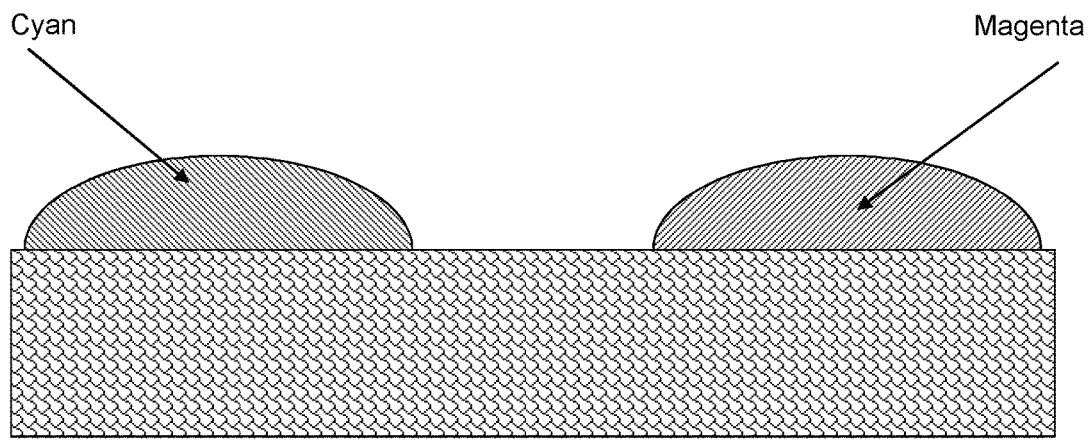
FIG. 1d illustrates a conventional process of printing on one side only of a media layer.
Figure 1D:
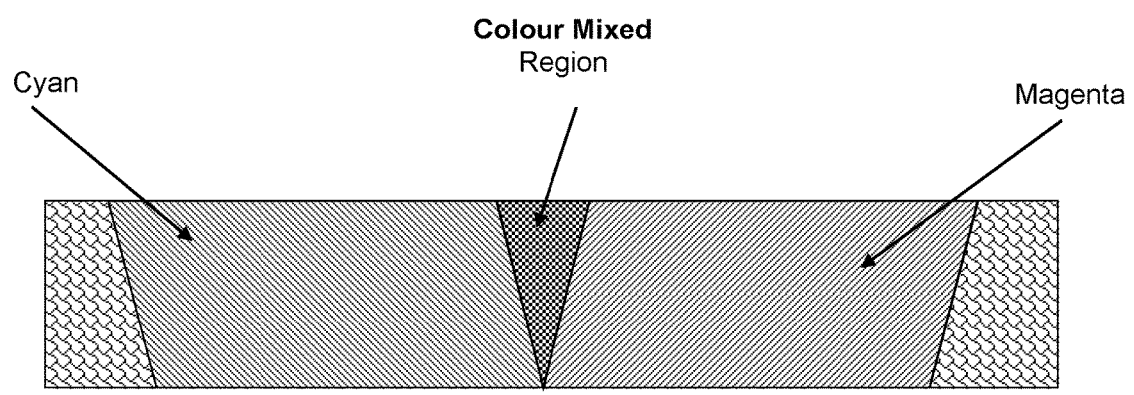
Figure 1E:
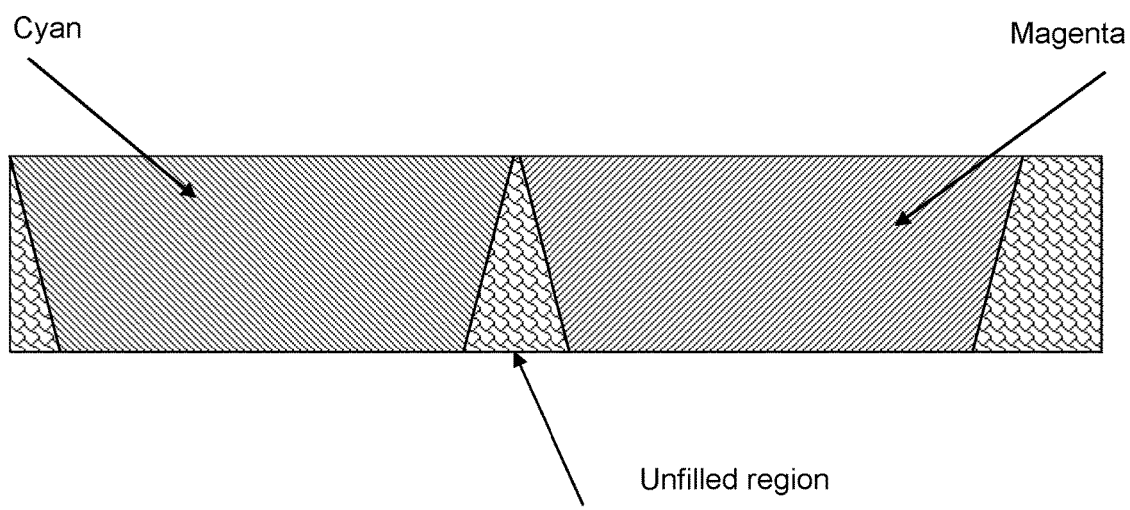
FIG. 1e illustrates a conventional process of printing colour dots on one side only of a media layer.

Exemplary arrangements of a Layer Object Manufacturing (LOM) system provided in accordance with the present teaching will be described hereinafter to assist with an understanding of the benefits of the present teaching. Such arrangements will be understood as being exemplary of the type of systems that could be provided and are not intended to limit the present teaching to any one specific arrangement as modifications could be made to that described herein without departing from the scope of the present teaching.

In one aspect of the present teaching, a Layered Object Manufacturing (LOM) system configured to assemble a plurality of individual media layers to form a coloured three-dimensional (3D) object is provided. Within the context of the present teaching, the individual media layers may be considered distinct physical elements or entities. In this way they may be individually picked and placed or otherwise transported within the system. The system may comprising a printer configured to colour print at least a portion of a first surface of each of a plurality of media layers, and colour print a corresponding portion of a second surface of the media layer, the second surface being opposite to the first surface, such that on operably printing the second surface a print-through region in the media layer is provided, and a collator configured to assemble the plurality of the individual media layers to form the 3D object. Each of the individual media layers may be individually or independently printed. Further provided is a printing module for printing 3D object media layers for forming a 3D object is provided. The present teaching also provides a LOM system including the printing module and a profiling and layer bonding module for cutting the individual 3D object media layers and bonding the individual layers together to form the finished 3D object. Also provided is an ink for colour 3D printing. The present teaching also provides a colour 3D offset printing process for printing additional information on each layer. This information provides error correction and build instructions to the profiling and layer bonding module for profile cutting the stack of colour printed layers.

The printing module may be a physically separate processing module from the collator that would conventionally form part of a LOM arrangement. Such an example is in our co-assigned application PCT/EP2008/66473. In one embodiment, the printing module may comprise an inkjet printer equipped with a duplex module to automatically invert the media when printing on its back surface. The printer may be configured to apply the colour prior to collation. The colour may also be applied during the collation process. The colour is applied through use of different inks. The collator may comprise a bonding module configured to bond individual ones of the plurality of media layers. The bonding module may be configured to use a water-based adhesive. The printer may be configured to print on first and second surfaces of the media layers. The printing on first and second surfaces operably reduces image bleed and preserves colour accuracy regardless of angle of the object's surface. The printer may be configured to apply multiple colours to one or more surfaces of one or more of the plurality of individual media layers. The collator may comprises a profiling module configured to effect a profiling of individual ones of the plurality of media layers to effect a desired 3D shape within the 3D object. The profiling module and the bonding module may be integrated in a single profiling and layer bonding module.

Suitable printers may include office printers that have large capacity input and output trays and come with duplex units as standard. The printing module 100 may also be integrated into the profiling and layer bonding module, such that the colour printing immediately precedes the profiling and bonding processes.

In accordance with the present teaching the printing ink utilised within the printing module may be optimised to penetrate most cellulose media types. Examples of such an ink will be described later. The colour printing process will now be described in detail.

In accordance with the present teaching a finished 3D object is formed from a stack of individual media layers which are assembled and profiled to form the desired final geometrical shape. In a preferred arrangement the individual media layers are sheets of cellulose based paper which may be printed or otherwise treated prior to the assembly arrangement. Accordingly, a plurality of 3D object media layers—such as the exemplary cellulose based paper, may be printed in preparation for forming the finished colour 3D printed article. The entire layer stack for the colour 3D printed article may be duplex pre-printed off-line in the printing module, after which the printed stack may be loaded into a profiling and layer bonding module where each printed layer may be profiled and bonded to complete the fabrication of the colour 3D printed article.

Figure 2A:
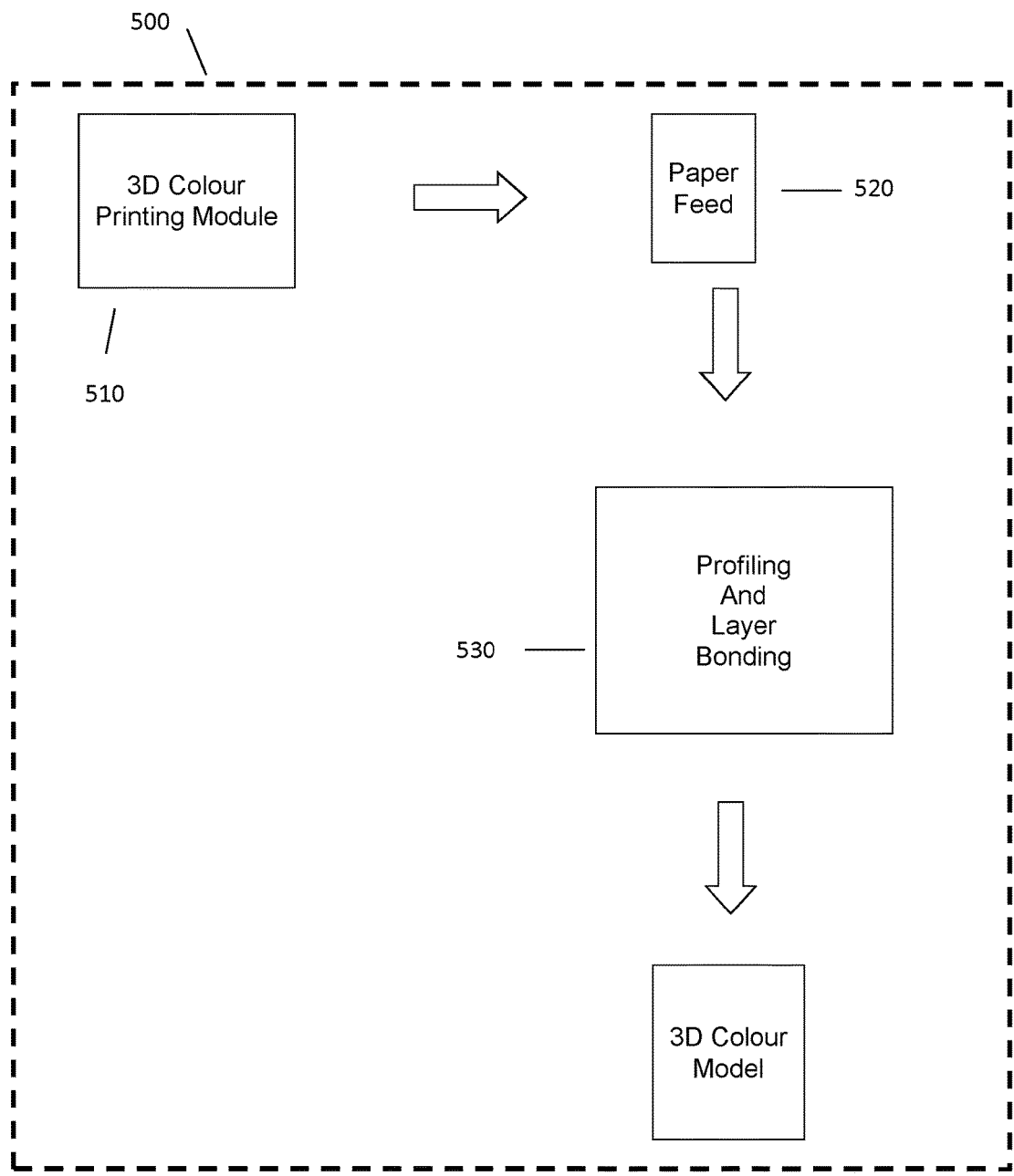
FIG. 2a is a block diagram of a Layer Object Manufacturing (LOM) system according to an embodiment of the present teaching.
Figure 2B:
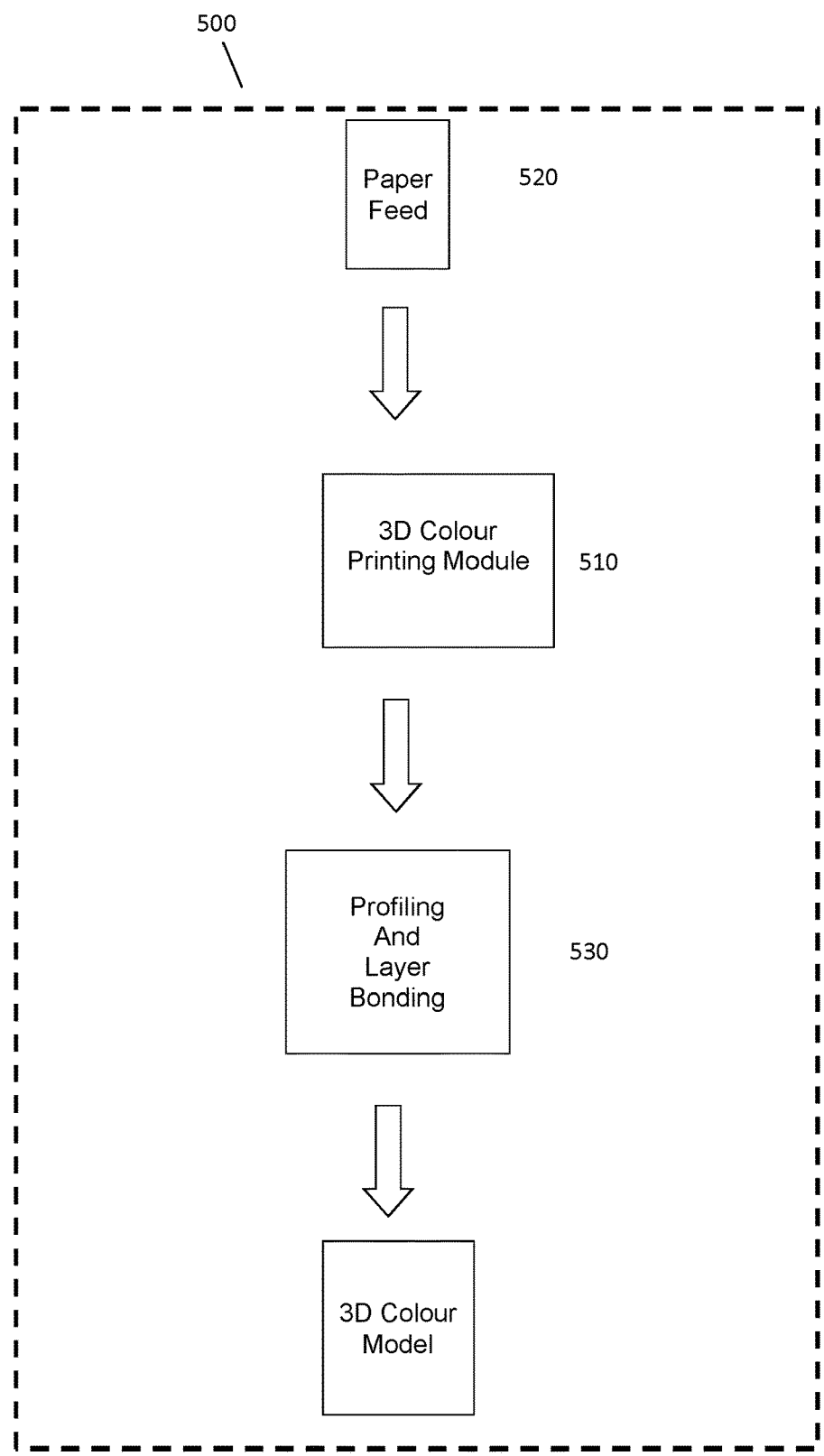
FIG. 2b is a block diagram of a Layer Object Manufacturing (LOM) system according to another embodiment of the present teaching.
Figure 2C:
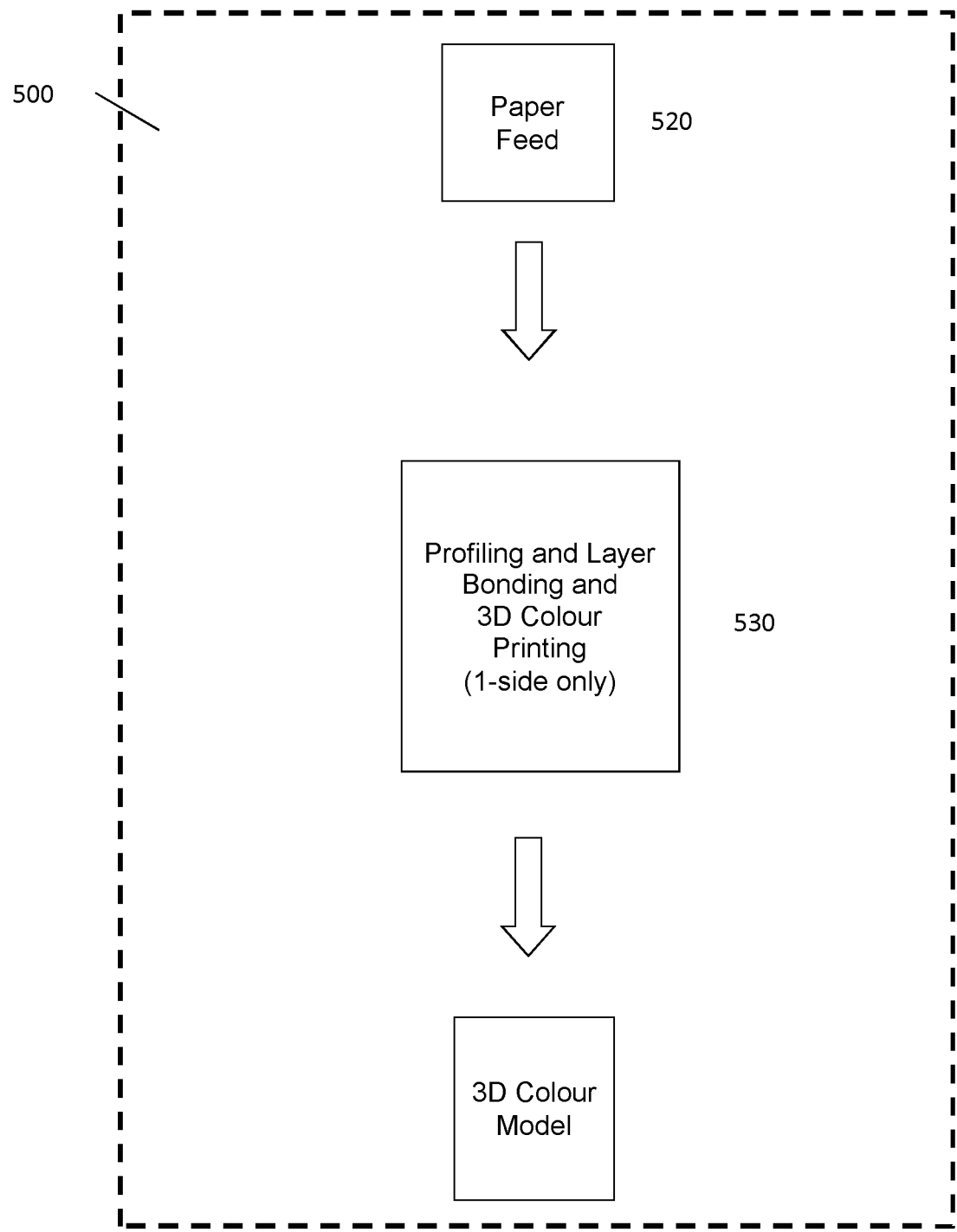
FIG. 2c is a block diagram of a Layer Object Manufacturing (LOM) system according to an embodiment of the present teaching.

FIG. 2a is a block diagram of a LOM system 500 according to one embodiment of the present teaching. Referring to FIG. 2a, the LOM system 500 may comprise a 3D colour printing module 510, a paper feed mechanism 520 and a profiling and layer bonding module 530. Paper may be duplex printed in the 3D colour printing module 510 before being fed into the profiling and layer bonding module 530 via the paper feed mechanism 520 to produce the completed colour 3D object. In FIG. 2b, paper may be fed into the 3D colour printing module 510 via the paper feed mechanism 520, and then profiled and bonded in the profiling and layer bonding module 530 to produce the completed colour 3D object. The profiling and layer bonding module 530 may comprise separate profiling and layer bonding modules respectively. In FIG. 2c, paper may be fed via a paper feed mechanism 520 into an integrated 3D colour printing, profiling and bonding module 540 which performs the printing, profiling and bonding processes, thereby producing a completed colour 3D object. In the embodiment of FIG. 2c, printing is performed on one side only of the media.

Figure 3:
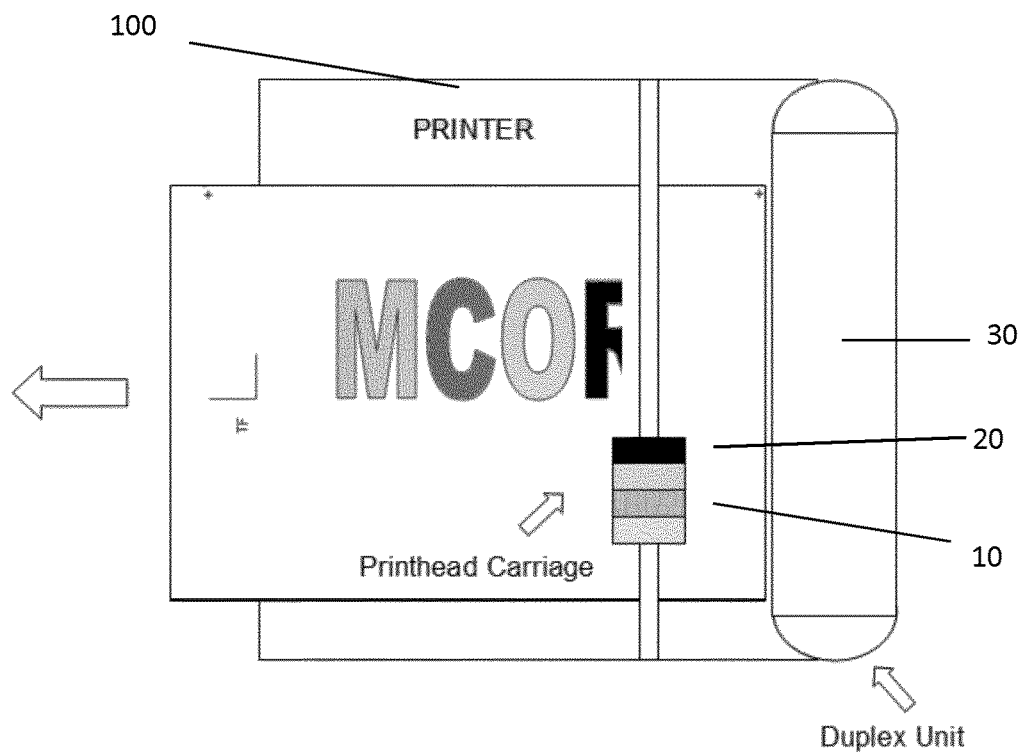
FIG. 3 illustrates a printing module printing a front side image of a 3D object media layer, according to an embodiment of the present teaching.

FIG. 3 illustrates a printing module 100 for printing a 3D object media layer, according to an embodiment of the present teaching. The printing module 100 may be configured to provide application of colour to both sides of the media layer. The colour delivered will therefore migrate from both sides as opposed to techniques where colour is applied from one side only. To provide this colouring of the media from both sides, a digital print file containing image, profile and colour information for the 3D object may be generated. This is then sent or otherwise loaded to the printing module 100. The digital print file may comprise a series of front-side-rear-side image pairs for each layer of the final stack. The colour part of the print file may comprise digital colour image information for both the front side and the rear side for all media layers to be printed. Each front-surface-rear-surface-front-surface image sequence may be aligned to one another in the digital file. The data set may also include physical front-surface-rear-surface alignment features which may be printed onto the media which allow both human and machine-readable alignment verification tests to be carried out to ensure front-back alignment is maintained during the course of the print run.

The printing module 100, which typically comprises a housing with specific areas, may be loaded with sufficient blank stock of media for the print task. As detailed above the media may comprise paper. The media rear, or trailing, edge and right-side edges may be accurately aligned in the paper tray to ensure that the media location during paper feed is reproduceable. FIG. 3 illustrates the printing of a front surface image using the printing module 100 according to an embodiment of the present teaching. Referring to FIG. 3, the printing module 100 may be configured for the printing of paper and may include a print head carriage 10, four colour heads 20, paper feed rollers and a paper feed mechanism (not shown), and a duplex unit 30 for inverting the media. Such a configuration and modifications thereto will be familiar to those of skill in the art of printers.

Figure 4:
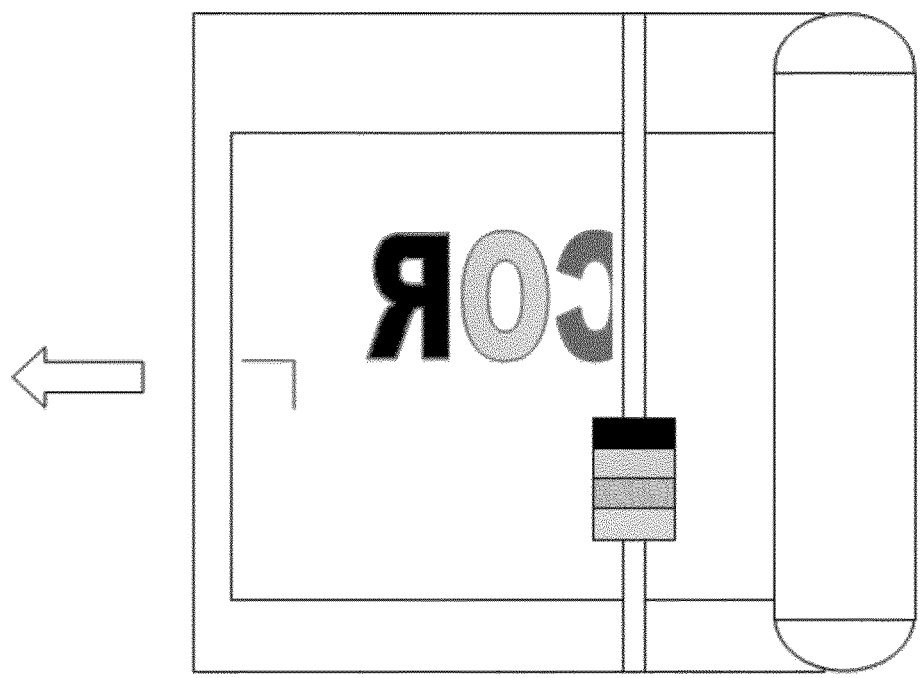
FIG. 4 illustrates the process of printing the rear side, that is, the mirror image of the front image.

The media stack may be printed layer by layer- or page by page of paper-, with first and second surfaces of each layer being colour printed, either simultaneously or in sequence. The first and second surfaces of each layer may be opposite to each other. The first surface of the layer may be a front planar surface of the layer and the second surface of the layer may be a rear planar surface. The media may be driven into the printing module by the paper feed rollers and then curled back or otherwise transported towards the front of the printing module 100 by the paper feed mechanism. The media may then be presented to the reciprocating print head carriage, fixed page wide print bar that deposits one or more ink colours which may then print the front surface image. Once the front surface image is printed, the paper feed rollers may reverse and pull the media layer into the duplex unit 30 which causes the media to back-flip and present the rear surface to be printed to the colour heads 20. The image printed on the rear surface may be a mirror image of the front-surface image. FIG. 4 is a diagram illustrating the process of printing the rear surface image of an object media layer which has already had the front surface printed.

The preceding example discusses duplex (two-sided) printing using a single print head carriage that scans across the width of the media layer during printing, followed by the use of a duplex unit which inverts the media layer to allow printing on the underside of the media layer. Other configurations could also be employed. For example, a page-wide array print head may alternatively be used instead of a scanning print head carriage. In this arrangement it will be appreciated that the only moving mechanism is the media feed rollers. Another embodiment dispenses with a duplex unit and employs two scanning carriages or two page-wide array print heads printing simultaneously on both sides of the media layer respectively. The advantage of this method is that mechanical mis-registration errors between the top and bottom images are eliminated as the media feed mechanism is substantially simplified to a planar media feed path and the two print head movements may be interlocked through sharing the same displacement encoder system.

Figure 5:
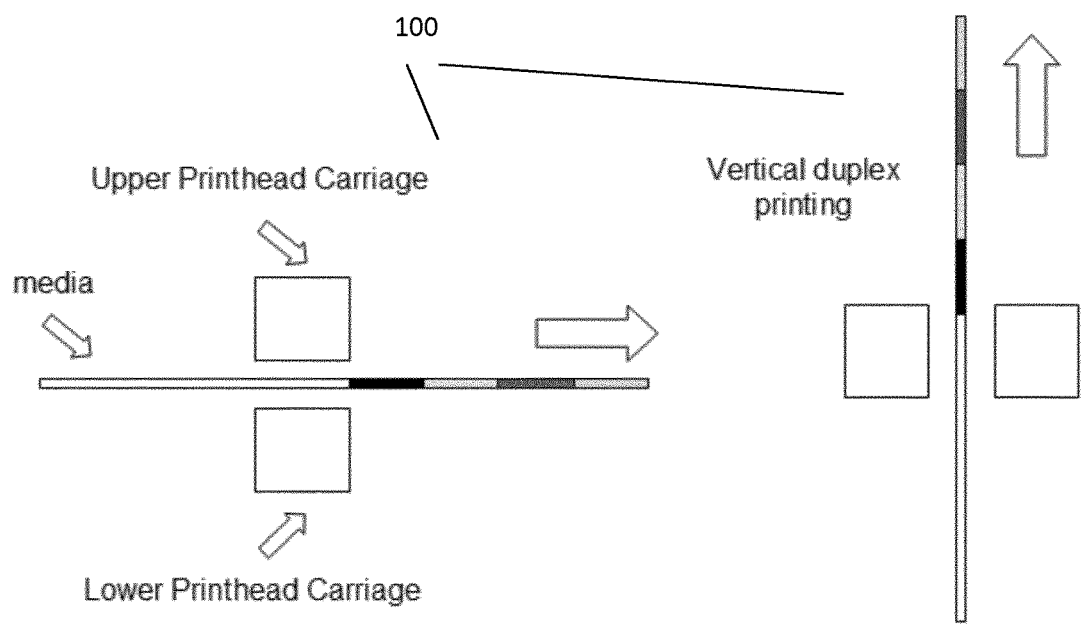
FIG. 5 illustrates horizontal and vertical simultaneous duplex printing with print head carriage pairs.
Figure 6:
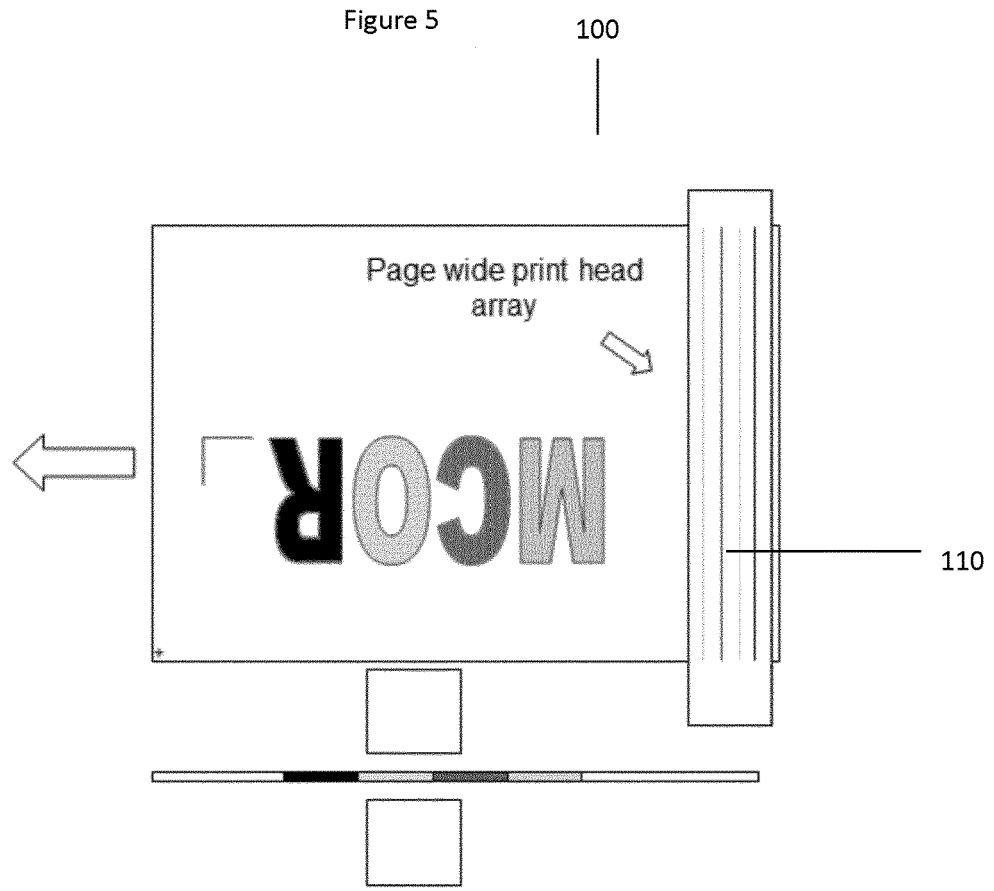
FIG. 6 illustrates horizontal and vertical simultaneous duplex printing with page-wide array print-heads.

The printing may be performed while the media object layer is disposed in a horizontal or vertical plane in the printing module as illustrated in FIG. 5. In this embodiment, upper and lower print head carriages are utilised at the first and second surfaces of the media layer, respectively. FIG. 6 illustrates a page-wide array print head 110 for horizontal or vertical simultaneous duplex printing. Also, the print head may be integrated into the profiling and layer bonding module, and operate between the paper feed and profiling and layer bonding processes, as a single stage process.

Test duplex prints may be printed and checked for alignment of the front and rear images by illuminating the rear of the media so that the rear image profile may be illuminated and superimposed on the front surface image. Alignment devices such as cross hairs may also be used on both sides of the object media layer to allow the operator to judge how much adjustment of the front and rear images needs to take place to ensure that both images are correctly aligned.

To enable accurate alignment of offset duplex printed media layers with one another on a layer-by-layer basis during the subsequent profiling and bonding of the media layer stack, a sensor on the profiling and bonding module 530 may read a printed fiducial on either the upper or lower surface of a printed media layer and use the fiducial's positional information to enable the module to move and locate the current media layer to be positionally coincident with the previously printed media layers.

Figure 7:
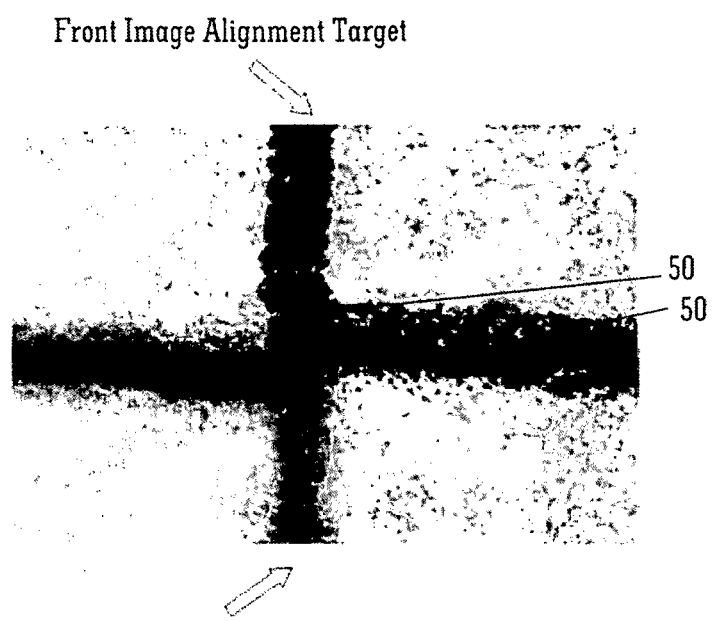
FIG. 7 is a photographic image of alignment devices used to align front and rear images.
Figure 8:
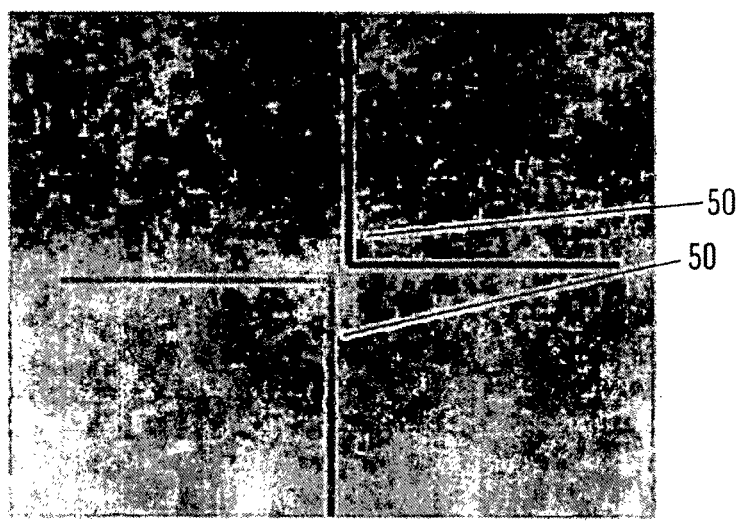
FIG. 8 illustrates a front-rear image alignment device.
Figure 9A:
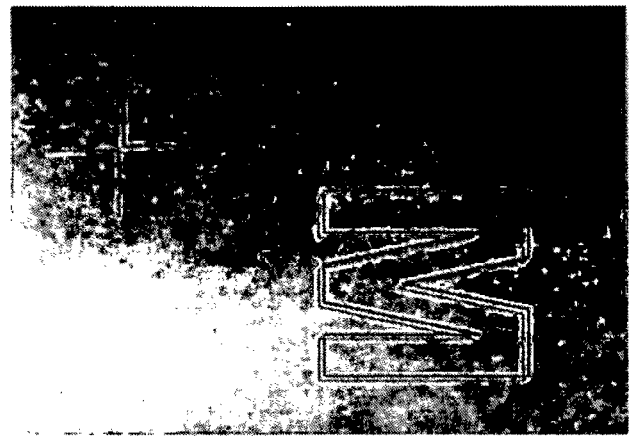
FIG. 9a illustrates an alignment device in the form of a letter "M" printed on both sides of a media layer and misaligned.
Figure 9B:
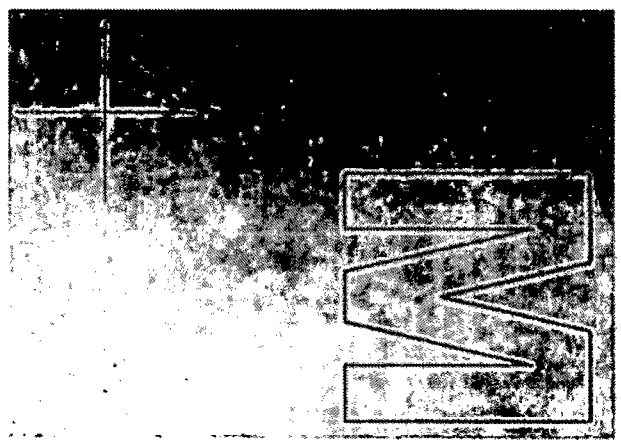
FIG. 9b illustrates an alignment device in the form of a letter "M" printed on both sides of a media layer and perfectly aligned.

FIG. 7 is a photographic image of an example of alignment devices 50 that may be used to align front and rear images. The alignment devices may be designed to align to form a cross-hair when the images on both sides are coincident and there is no misalignment. In FIG. 8 the upper right-hand quadrant is printed on the front of the media layer, and the bottom left quadrant is printed on the rear of the media layer. Referring to FIG. 8, the front image is positioned too much to the right, and higher than the rear image. Neither the vertical lines nor the horizontal lines in each of the devices 50 align correctly. As illustrated in FIG. 9*a*, the letter "M" has been printed on both sides of the media layer and is misaligned. When the alignment devices are in perfect alignment, the front image and the rear mirror image are superimposed perfectly, as illustrated in FIG. 9*b*.

The method described above comprises pre-printing colour on both sides of the 3D object media layer (offset printing). After a plurality of such layers are formed, the layers may be bonded together and profiled to complete the formation of the colour 3D printed object. The profiling process may comprise cutting the layers according to a predetermined pattern.

Figure 10:
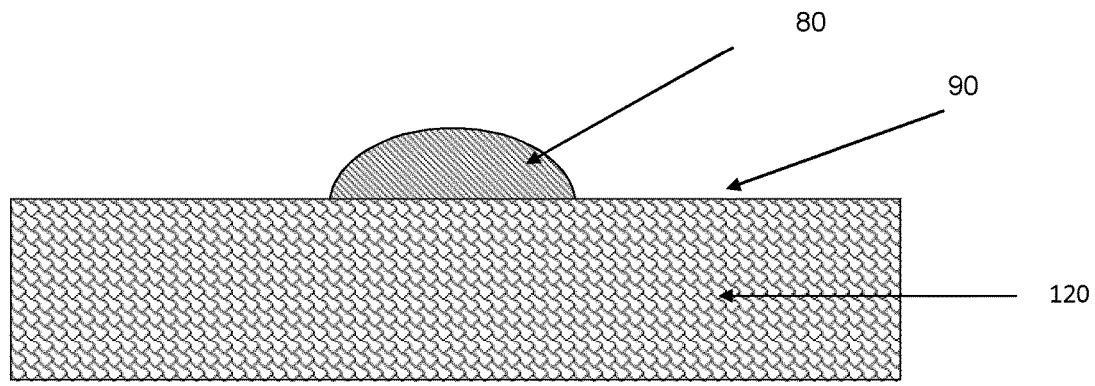
FIG. 10 illustrates ink deposited onto a media layer from the front side of a media layer, according to an embodiment of the present teaching.
Figure 11:
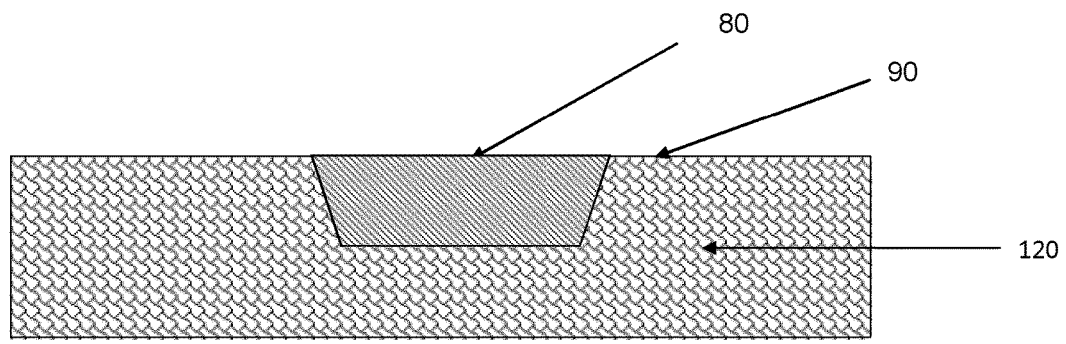
FIG. 11 illustrates how sufficient ink is deposited to penetrate approximately half way through the media layer, according to the present teaching.

According to a specific embodiment of the present teaching, printing takes place from both sides of the media layer with sufficient ink to penetrate approximately half way through the thickness of the media later on both sides respectively. FIG. 10 illustrates ink 80 being deposited onto a front surface 90 of a media layer 120. Sufficient ink 80 may be deposited to penetrate approximately half way through the media layer 120, as shown in FIG. 11. During printing, as soon as the ink makes contact with the media it begins to be absorbed by the media in three dimensions, in the plane of the media (in directions X and Y) and through the thickness of the media. As a consequence, the size of the printed dot pixel grows over time, from the initial surface contact dimensions. By printing on both sides of the media this spread in the dot size is reduced to a value approximately half of the spread in image, had one wanted to print through the entire media thickness layer from one side.

Figure 12:
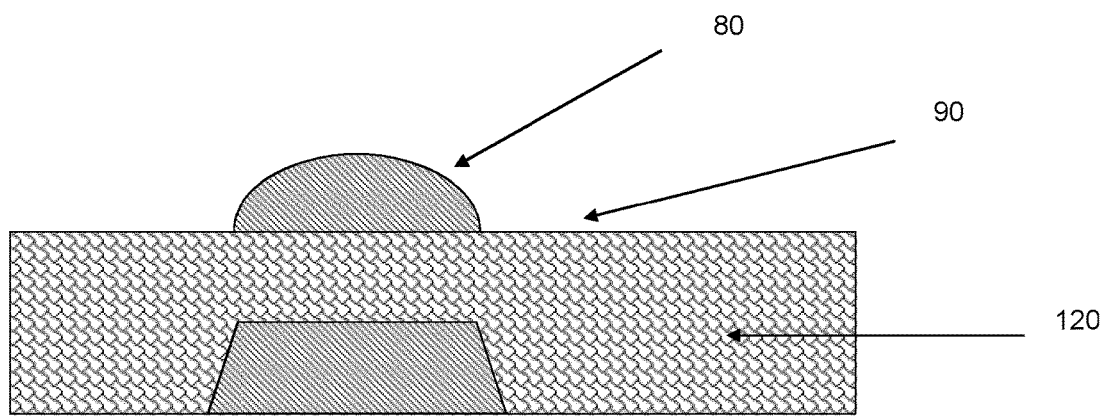
FIG. 12 illustrates ink deposited onto the media layer from the rear side at a coincident location to the front side image, according to an embodiment of the present teaching.
Figure 13:
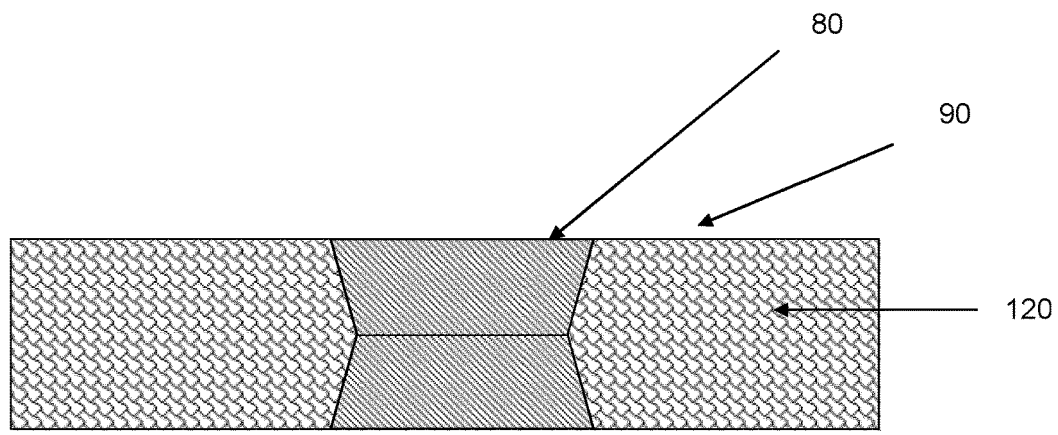
FIG. 13 illustrates how ink absorbed from the front and rear side images are combined.

Ink 80 may be similarly deposited on a rear surface 95 of the media layer 120, either simultaneously, using duplex printing, or after the media layer 120 is inverted using a duplex unit, as described above. This step is illustrated in FIG. 12. According to the present teaching, the front and rear images may be configured to be coincident and to create a print-through region 85. A print-through region, as illustrated in FIG. 13, means that the entire thickness of a region of the media layer 120 comprises ink.

Referring to FIG. 2*b*, after a stack of such media layers has been printed in the printing module 100, the stack may be transferred to the profiling and layer bonding module 530. As shown in FIG. 2*c*, it is possible to print on a stack of already assembled individual media layers. It is also possible, although not shown, to offset print duplex media layers individually and then immediately feed them into the profiling and bonding module 530.

Figure 14:
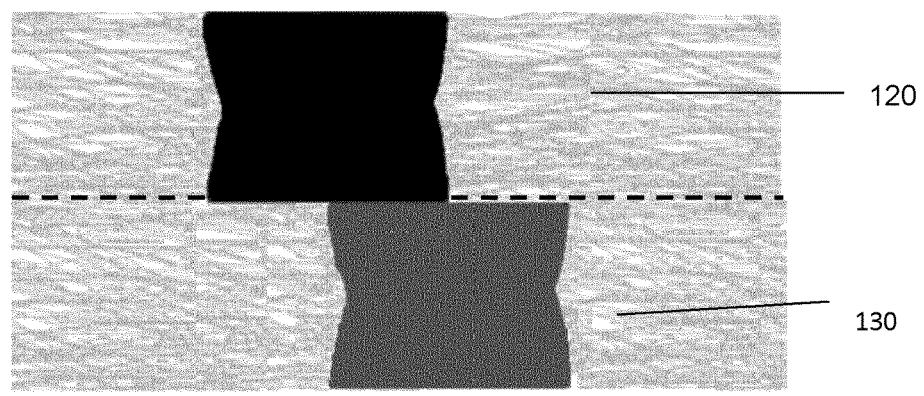
FIG. 14 illustrates two pre-printed layers after a bonding process, according to the present teaching.
Figure 15:
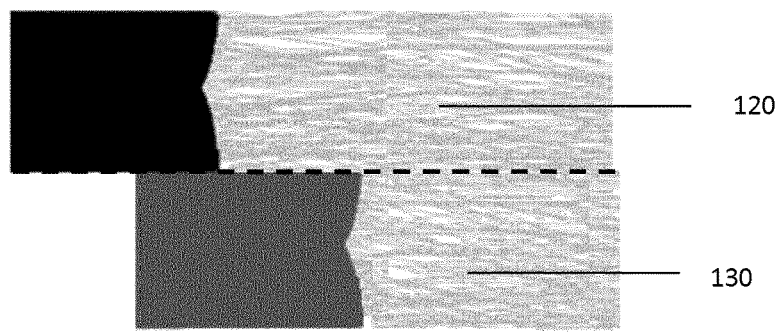
FIG. 15 illustrates an edge and colour profile of the combined layers after bonding and weeding showing removal of unwanted media.

The first layer may be placed on the profiling and layer bonding module 530, and that layer may be profile cut with a computer-controlled blade. This cut may provide precise colour edge definition compared to the ragged, liquid-flow edge achieved using inkjet printing alone. Then the next layer may be positioned and bonded on top of the previous layer and then profile cut. The process is continued until all pre-printed layers have been bonded and profile cut in the profiling and layer bonding module 530. FIG. 14 illustrates two-pre-printed layers 120 and 130 after bonding, and FIG. 15 illustrates the edge and colour profile of the two layers 120 and 130 after bonding and profiling or weeding. The profiling, or weeding, process comprises removal of unwanted portions of the media layers.

The colour 3D printing process described above provides several advantages. When a media layer is printed from both sides simultaneously, less image spread occurs, thus providing better image feature dimensional control. No colour interaction between printed layers occurs, which preserves the fidelity of the desired image. Offset printing enables printing by an entity, for example the printing module described above, remote from the location where profiling and lamination of layers takes place. This offers a number of advantages such as prototyping and adjusting colour before 3D layer assembly, as will be described below, as well as allowing the profiling and layer bonding module 530 to be fully utilized in profiling and bonding.

The present teaching also provides media, for example paper, and ink for that is optimised for 3D colour printing. According to an embodiment of the present teaching, media for 3D colour printing may be designed with a reduced concentration of sizing agent in the body of the media, and a reduced concentration of sizing agent on the two surfaces of the media.

In addition, the media may be treated during manufacturing, or post-manufacturing with a solution of a non-ionic surfactant such as ethoxylated 2,4,7,9-tetramethyl-5-decyne-4,7-diol, an ethoxylated acetylenic diol making up between 0.1% and 1.0% concentration in water as a post processing surface spray.

When the media is constructed in the manner, and printed with water-based and dye colourant inkjet ink (or a mixture of water and ethanol based in), the ink fluid may be rapidly adsorbed by the media and may permeate through the thickness of the media rapidly.

In terms of the ink used in colour 3D printing, the present teaching provides an ink that is designed to be receptive and readily adsorbed by the media throughout the media's thickness. This is achieved by the addition of surfactants that may reduce the surface tension of the ink further, ensuring that the ink is able to penetrate most cellulose media types. This is counter-intuitive to conventional desktop inkjet printing, where it is desirable to retain substantially a colour penetration of the media surface only, leaving the body of the media free of ink. The ink composition may include a non-ionic surfactant such as ethoxylated 2,4,7,9-tetramethyl-5-decyne-4,7-diol, an ethoxylated acetylenic diol making up between 0.1% and 1.0% concentration of the ink. The balance of the ink composition may include water (75%-85%), water soluble dyes (up to 5%), humectants such as glycerides (up to 5%), anti-bacterials agents, and alcohols (up to 8%). Conventional 2D inkjet ink has a surface tension of 34-38 dynes/cm; however in accordance with the present teaching, for 3D printing it is desirable to reduce the surface tension of the ink to below 30 dynes/cm. The addition of 1% of an ethoxylated acetylenic diol has been shown by the present inventors to reduce the surface tension of the ink to a value of approximately 26 dynes/cm, rendering the ink to be rapidly absorbed by the paper.

During the 3D offset colour printing process, additional information may be printed into the margins of each layer to provide error correction and build instructions. Each printed layer may include a sequence code that may be read by the profiling module, and verifies that the layer to be profiled is in the correct sequence. Each printed layer may include a code that informs the profiling module what media type is in the sequence. Media refers to the substrate that is being used in the 3D fabrication process may be cellulose paper. However other media types may also be employed, and may include, polymer film, metal foils, ceramic powder impregnated paper sheets, metal powder impregnated sheets, polymer powder impregnated sheets, water soluble papers, and substrates made from waxes. The code may inform the profiler that a particular layer requires a different profiling recipe (for example, slower cut, or deeper cut due to a thicker or difficult to cut media type). The code may inform the profiler that, for example, the next three layers have an identical profile, and to perform a multiple layer cut. The media may also include media alignment marks which inform the profiler how to align each media layer relative to the profiler table.

According to the present teaching, there may be two zones of material in a printed 3D object build:
  a) the bond zone—media layers in this zone may be strongly bonded together. The finished object may be constructed of these layers.
  b) the tack zone—media layers in this zone may be temporary, support layers. These layers may be weakly bonded together (tacked) so that they may easily separate during the weeding process when unwanted support material is removed from the printed media stack to reveal the 3D printed object.

Figure 16:
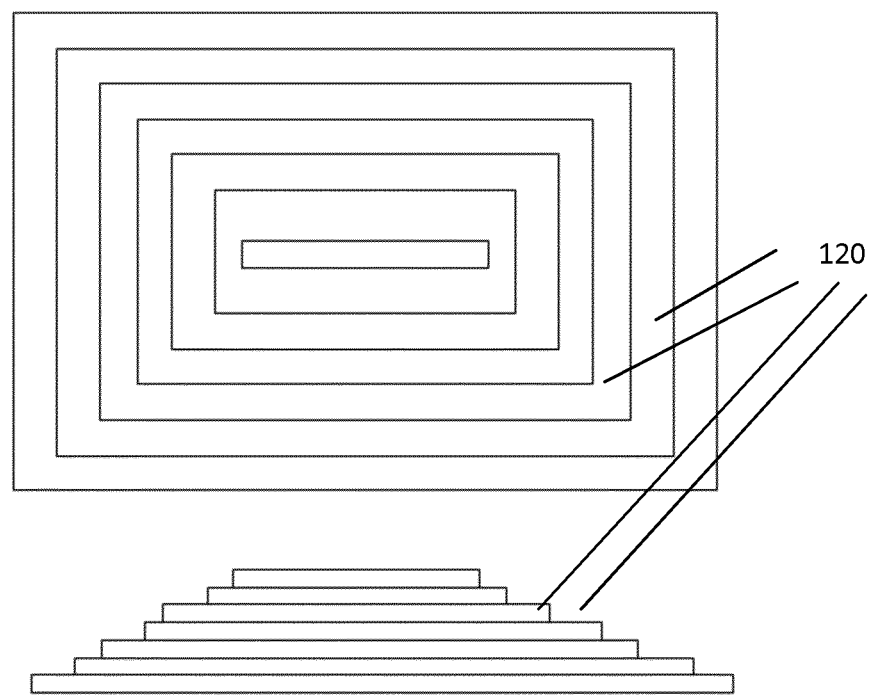
FIG. 16 illustrates a plan and cross-sectional view of a 3D object to be formed after weeding.
Figure 17:
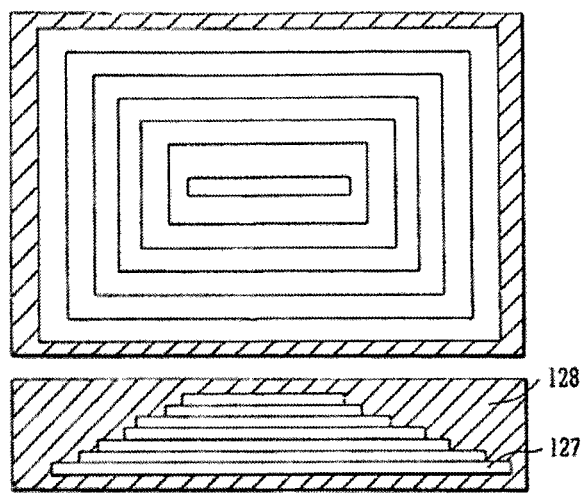
FIG. 17 illustrates a plan and cross-sectional view of a 3D object after being printed and before weeding.

The material in the tack zone may be colour coded for a number of layers approaching the bond zone. Such colour coding might be a red cross-hatched area, which directs the weeding technician to proceed with caution during weeding as permanently bonded layers lie beneath the coloured cross-hatched area. FIG. 16 illustrates a plan and cross-sectional view of a 3D object to be formed after weeding. The 3D object may comprise a plurality of colour 3D media layers 120. FIG. 17 illustrates a plan and cross-sectional view of a 3D object after being printed and before weeding. The 3D object may comprise a plurality of media object layers, each comprising a bond zone 127 and a tack zone 128. A number of the layers in the tack zone may be printed with a cross-hatched pattern. During the 3D printing process, the tack zone may be co-printed with the 3D printed object so that a number of tack layers above the bonded layers of the 3D object may be printed with a cross-hatched pattern to indicate that the solid object is close by. After printing, the 3D object and the tacked waste material, (containing layers of cross-hatched material) may coexist in one complete block of tacked and bonded media layers.

Figure 18:
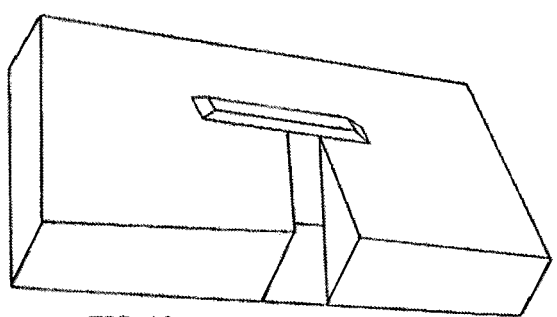
FIG. 18 illustrates a partially weeded object showing colour hatching.
Figure 19:
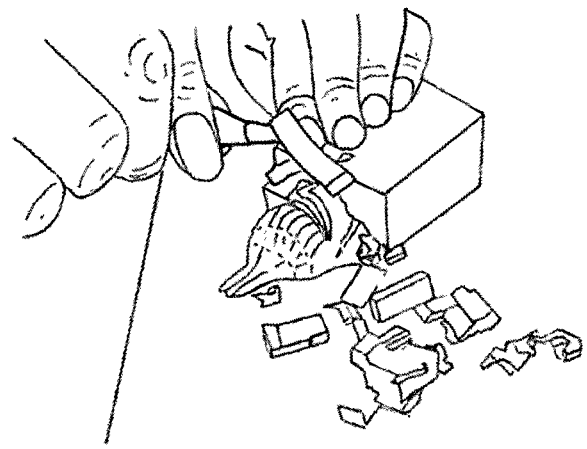
FIG. 19 is a photographic image of a colour 3D object during the weeding process.
Figure 20:
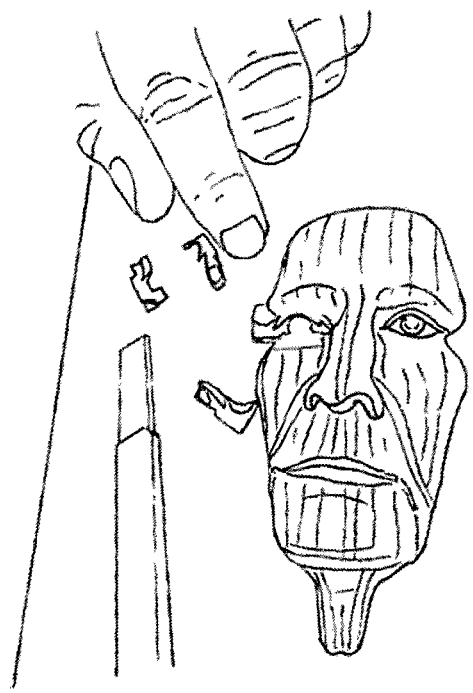
FIG. 20 is a photographic image of a colour 3D object after weeding.

During weeding, the unmarked tack layers may be peeled away. When a coloured cross-hatched region is reached, the weeding technician may proceed with caution, until the solid object is reached. FIG. 18 shows a solid 3D printed pyramid structure being revealed as tacked materials are removed. The cross hatched regions are represented in FIG. 18 by the darker shaded zones. These regions may be carefully removed. Colour codes and/or other marks may be used to indicate proximity to the build object. FIG. 19 is a photographic image of an example of a colour 3D object during the weeding process, and FIG. 20 is a photographic image of the completed colour 3D object after weeding has been performed. It is clear that by delimiting the intended 3D object from the off cut regions through a colouring process it is possible to ensure that the final 3D object is not damaged during the removal of the tacked material.

It will be understood by the skilled person in the art that the colour printing process described above may be performed in a separate module to the profiling and layer bonding module. However, the printing module may alternatively be integrated into the profiling and layer bonding module, whereby the colour printing process may be performed first, followed by bonding and profiling. In this embodiment the printing process is not 'offset' but rather integrated into the assembly process. The present teaching further provides a LOM system including the printing module and a separate profiling and layer bonding module for cutting the individual 3D object media layers and bonding the individual layers together to form the finished 3D object. In this case the colour printing is "offset" with respect to the bonding and profiling. Also, it will be understood that the ink according to the present teaching may be used in the printing module.

The words comprises/comprising when used in this specification are to specify the presence of stated features, integers, steps or components but does not preclude the presence or addition of one or more other features, integers, steps, components or groups thereof.

While the present invention has been described with reference to some exemplary arrangements it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

The invention claimed is:

1. A Layered Object Manufacturing, LOM, system configured to assemble a plurality of individual media layers to form a coloured three-dimensional (3D) object, the system comprising:
  a. an inkjet printer configured to colour print at least a portion of a first surface of each of a plurality of media layers, and colour print a corresponding portion of a second surface of the media layer, the second surface being opposite to the first surface, and wherein on each of the plurality of media layers a first image is printed on the first surface and a second image is printed on the second surface, the system being configured such that when the second surface is presented to the printer the first and second images are coincident such that on operably printing the second surface a print-through region in the media layer is provided such that the entire thickness of the print-through region of the media layer comprises ink;

wherein the first and second images are printed on each of the first and second surfaces with sufficient ink to penetrate approximately half-way through the thickness of the media layer without colour interaction occurring between the first and second images printed on the first and second surfaces of the media layer, and b. a collator configured to assemble the plurality of the individual media layers to form the 3D object.

2. The system of claim 1, wherein the printer and collator are configured such that the printer effects printing of an individual media layer prior to a collation of that layer with a previously printed layer.

3. The system of claim 1, wherein the printer is configured to apply the colour during the collation.

4. The system of claim 1, wherein the collator comprises a bonding module configured to bond individual ones of the plurality of media layers.

5. The system of claim 4, wherein the bonding module is configured to use a water-based adhesive.

6. The system of claim 1, wherein the printing on the first and second surfaces operably reduces image bleed and preserves colour accuracy regardless of angle of the object's surface.

7. The system of claim 1, wherein the printer is configured to apply multiple colours to at least a portion of the first and second surfaces of each of the plurality of individual media layers.

8. The system of claim 1, wherein the collator comprises a profiling module configured to effect a profiling of individual ones of the plurality of media layers to effect a desired 3D shape within the 3D object.

9. A colour 3D object media layer printing module for providing a print-through region in a 3D object media layer, the module comprising:

an inkjet printer configured to colour print a first surface of a 3D object media layer to create a first image, colour print a second surface of the 3D object media layer to create a second image, the second surface being opposite to the first surface; and wherein the module is configured such that the second surface is presented to the printer such that the first and second images are coincident and on operably printing the second surface of the 3D object media layer a print-through region in the 3D object media layer is provided such that the entire thickness of the print-through region of the media layer comprises ink; and wherein the first and second images are printed on each of the first and second surfaces with sufficient ink to penetrate approximately half-way through the thickness of the media layer respectively without colour interaction occurring between the first and second images printed on the first and second surfaces of the media layer.

10. The module of claim 9, wherein the printer comprises a print head carriage that is configured to scan across the width of an object media layer during printing.

11. The module of claim 9, wherein the printer comprises a page-wide array print head.

12. The module of claim 9, further comprising a duplex module, wherein the duplex module operably inverts the media layer before presenting the media layer to the printer for printing the second surface.

13. The module of claim 10, comprising first and second print head carriages configured to print simultaneously on the first and second surfaces of the object media layer.

14. The module of claim 11, comprising first and second page-wide array print heads configured to print simultaneously on the first and second surfaces of the object media layer.

15. The module of claim 9, being configured so that the media object layer is printed while disposed horizontally.

16. The module of claim 9, being configured so that the media object layer is printed while disposed vertically.

17. The module of claim 9, wherein the printer operatively prints additional information on the object media layer to provide error correction and build instructions for a profiling and layer bonding module.

18. The module of claim 17, wherein the printer operatively prints the additional information on a tack zone of the object media layer, the object media layer comprising a bond zone and the tack zone.

19. The module of claim 17, wherein the additional information comprises a code that is readable by the profiling and layer bonding module.

20. The module of claim 19, wherein the code comprises a sequence code that verifies that the layer to be profiled is in the correct sequence.

21. The module of claim 19, wherein the code comprises a media type code that informs the profiling and layer bonding module what media type the media layer is.

22. The module of claim 19, wherein the code comprises a profiling recipe that informs the profiling and layer bonding module what type of cut to perform.

23. The module of claim 22, wherein the profiling recipe informs the profiling and layer bonding module to perform a multiple layer cut.

24. The module of claim 17, wherein the additional information comprises a media alignment mark which informs the profiling and layer bonding module how to align each media layer.

25. The module of claim 9, wherein the first surface comprises a front planar surface of the media layer and the second surface comprises a rear planar surface of the media layer.

26. The module of claim 9, wherein the printer operatively prints the plurality of 3D object media layers using a print file containing image and colour information for a 3D object formed from the plurality of 3D object media layers.

27. The module of claim 26, wherein the print file comprises a series of front-surface-rear-surface image pairs for each layer.

28. The module of claim 9, being integrated in the system of claim 1.

* * * * *